(12) United States Patent
Augé et al.

(10) Patent No.: US 11,818,030 B2
(45) Date of Patent: Nov. 14, 2023

(54) RELIABLE SWITCH FROM REGULAR IP TO HYBRID-ICN PULL-BASED COMMUNICATIONS FOR PROXY APPLICATIONS

(71) Applicant: Cisco Technology, Inc., San Jose, CA (US)

(72) Inventors: Jordan François Jean Augé, Saint-Cyr-l-Ecole (FR); Mauro Sardara, Issy-les-Moulineaux (FR); Angelo Mantellini, Gland (CH)

(73) Assignee: CISCO TECHNOLOGY, INC., San Jose, CA (US)

( * ) Notice: Subject to any disclaimer, the term of this patent is extended or adjusted under 35 U.S.C. 154(b) by 20 days.

(21) Appl. No.: 17/176,269

(22) Filed: Feb. 16, 2021

(65) Prior Publication Data
US 2022/0200886 A1 Jun. 23, 2022

Related U.S. Application Data

(60) Provisional application No. 63/128,449, filed on Dec. 21, 2020.

(51) Int. Cl.
*H04L 45/02* (2022.01)
*H04L 69/164* (2022.01)
(Continued)

(52) U.S. Cl.
CPC .......... *H04L 45/02* (2013.01); *H04L 43/0817* (2013.01); *H04L 45/745* (2013.01);
(Continued)

(58) Field of Classification Search
CPC ... H04L 45/02; H04L 43/0817; H04L 45/745; H04L 63/0281; H04L 67/28; H04L 69/164; H04L 69/326; H04L 69/40; H04L 67/56
See application file for complete search history.

(56) References Cited

U.S. PATENT DOCUMENTS 8,117,322 B1 * 2/2012 McQuade ............... H04L 69/14
709/219
10,749,995 B2 8/2020 Muscariello et al.
(Continued)

FOREIGN PATENT DOCUMENTS

WO 2017004508 A1 1/2017

*Primary Examiner* — Mohamed A. Wasel
*Assistant Examiner* — Zonghua Du
(74) *Attorney, Agent, or Firm* — Edell, Shapiro & Finnan, LLC

(57) ABSTRACT

Presented herein are a combination of techniques that will ensure that the traffic is sent to the proxy right from the first packet without any delay using transient transport, and upgraded to Hybrid Information-Centric Networking (hICN) immediately upon completion of the stack initialization and we have full connectivity. More specifically, a mechanism is provided to dynamically establish hICN connections to transport latency-sensitive traffic, due to a transient User Datagram Protocol (UDP) fallback. This allows a reliable conversion between the push-based IP model, and the pull-based hICN model with no connectivity interruption. This is useful to implement proxy functionalities exposing regular IP applications to hICN to leverage its benefits in terms of performance or seamless mobility.

20 Claims, 9 Drawing Sheets

(51) Int. Cl.
  *H04L 69/326* (2022.01)
  *H04L 43/0817* (2022.01)
  *H04L 9/40* (2022.01)
  *H04L 45/745* (2022.01)
  *H04L 69/40* (2022.01)
  *H04L 67/56* (2022.01)
(52) U.S. Cl.
  CPC .......... *H04L 63/0281* (2013.01); *H04L 67/56* (2022.05); *H04L 69/164* (2013.01); *H04L 69/326* (2013.01); *H04L 69/40* (2013.01)

(56) References Cited

U.S. PATENT DOCUMENTS

| | | | |
|---|---|---|---|
| 2013/0332619 A1* | 12/2013 | Xie | H04L 67/2823 709/230 |
| 2015/0256654 A1* | 9/2015 | Oguchi | H04L 43/0841 709/230 |
| 2016/0373390 A1* | 12/2016 | Wood | H04L 67/63 |
| 2016/0380945 A1* | 12/2016 | Wood | H04L 67/63 709/204 |
| 2017/0041420 A1* | 2/2017 | Solis | H04L 67/1097 |
| 2017/0201375 A1* | 7/2017 | Amin | H04L 63/061 |
| 2017/0373975 A1* | 12/2017 | Moiseenko | H04L 61/1511 |
| 2018/0006968 A1* | 1/2018 | Kutscher | H04L 49/3009 |
| 2018/0206278 A1* | 7/2018 | Mildh | H04L 67/327 |
| 2018/0227390 A1 | 8/2018 | Reznik et al. | |
| 2018/0241669 A1 | 8/2018 | Muscariello et al. | |
| 2018/0241679 A1 | 8/2018 | Muscariello et al. | |
| 2018/0270300 A1* | 9/2018 | Reznik | H04L 67/568 |
| 2019/0297014 A1 | 9/2019 | Azgin et al. | |
| 2021/0126829 A1* | 4/2021 | Kanagarathinam | H04L 41/0866 |

\* cited by examiner

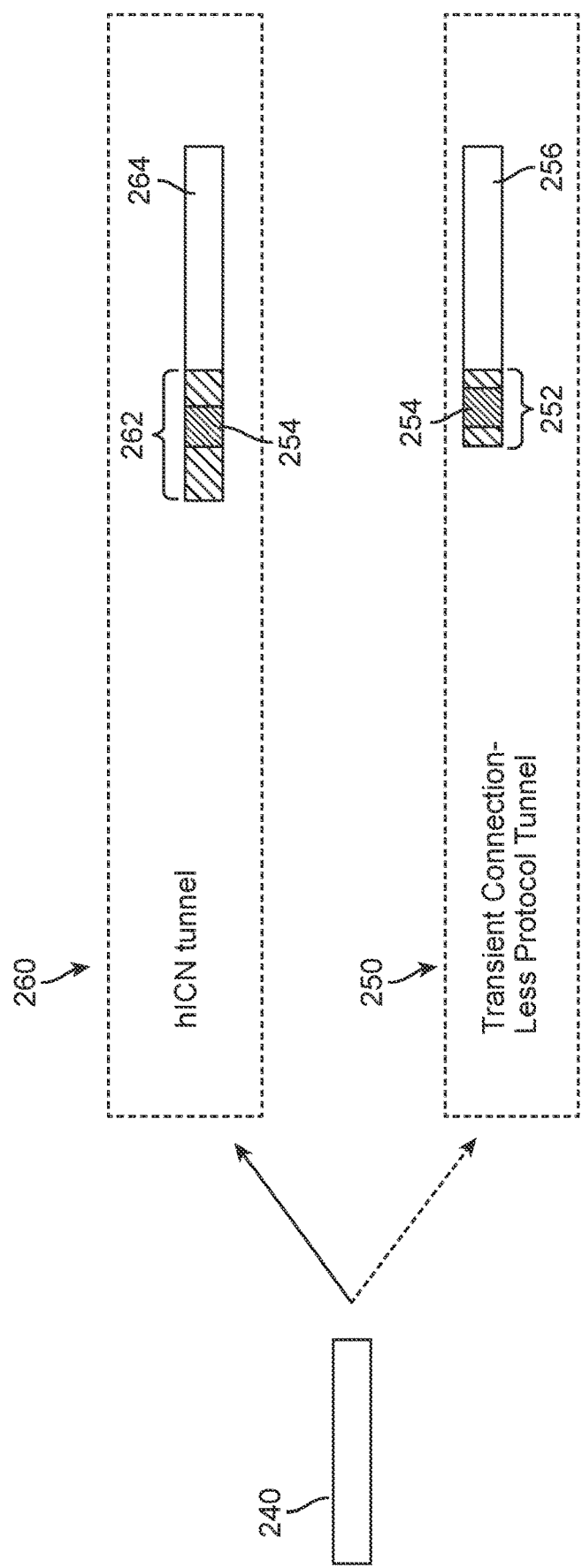

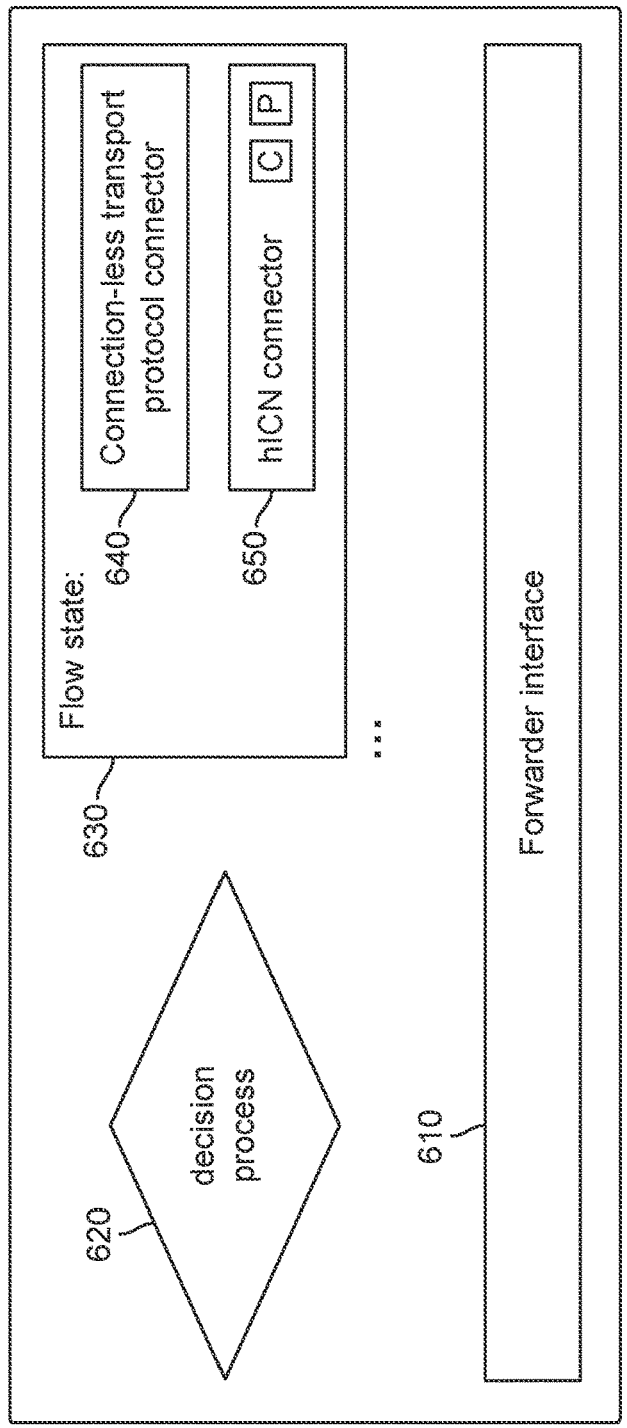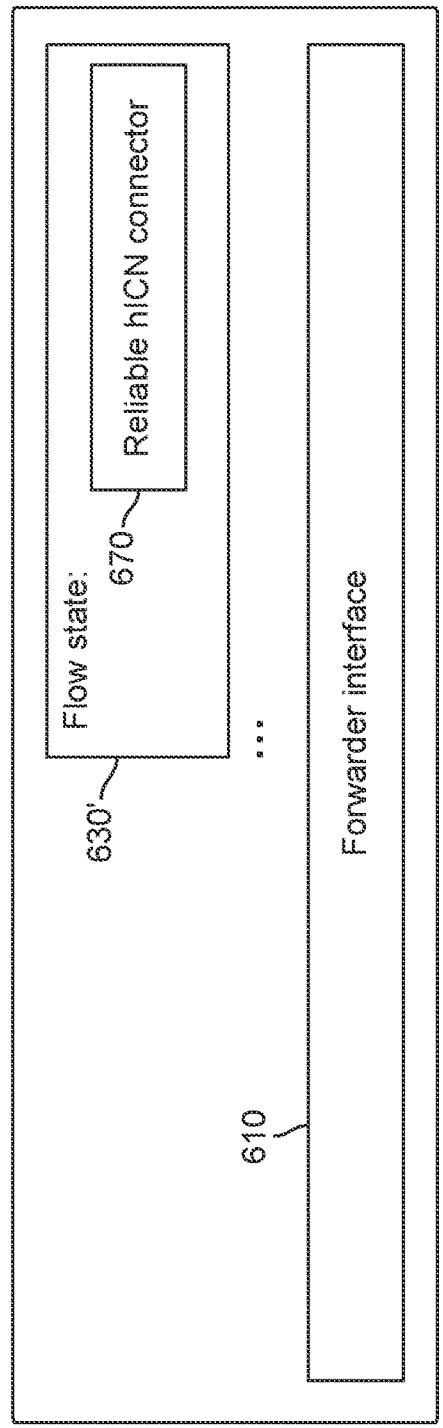

RELIABLE SWITCH FROM REGULAR IP TO HYBRID-ICN PULL-BASED COMMUNICATIONS FOR PROXY APPLICATIONS

CROSS REFERENCE TO RELATED APPLICATION

This application claims priority to U.S. Provisional Application No. 63/128,449, filed Dec. 21, 2020, the entirety of which is incorporated herein by reference.

TECHNICAL FIELD

The present disclosure relates to hybrid Information-Centric Networking (hICN).

BACKGROUND

Hybrid ICN, or simply hICN, is an alternative transport to regular Internet Protocol (IP) protocols as it provides a number of benefits to application flows, such as optimized latency and seamless mobility. This makes it useful to deploy on mobile devices or cloud-native environments, in order to guarantee the performance of latency-sensitive traffic application such as videoconferencing, gaming or other Real-Time Communication (RTC) applications. Until widespread adoption, hICN proxies remain the preferred insertion path to demonstrate and leverage some of the benefits provided by the technology, receiving regular IP traffic on one side, and exposing it over hICN sockets on the other side, going through the local forwarder and outside.

BRIEF DESCRIPTION OF THE DRAWINGS

FIG. 2B is a diagram showing how a unique identifier may be used to track traffic over both an hICN connection and a transient connection-less transport protocol connection, according to an example embodiment.

FIG. 6A is a diagram showing implementation of the mechanisms without hICN face abstraction, according to an example embodiment.

FIG. 6B is a diagram showing implementation of the mechanisms with hICN face abstraction, according to an example embodiment.

DESCRIPTION OF EXAMPLE EMBODIMENTS

Overview

Figure 1:
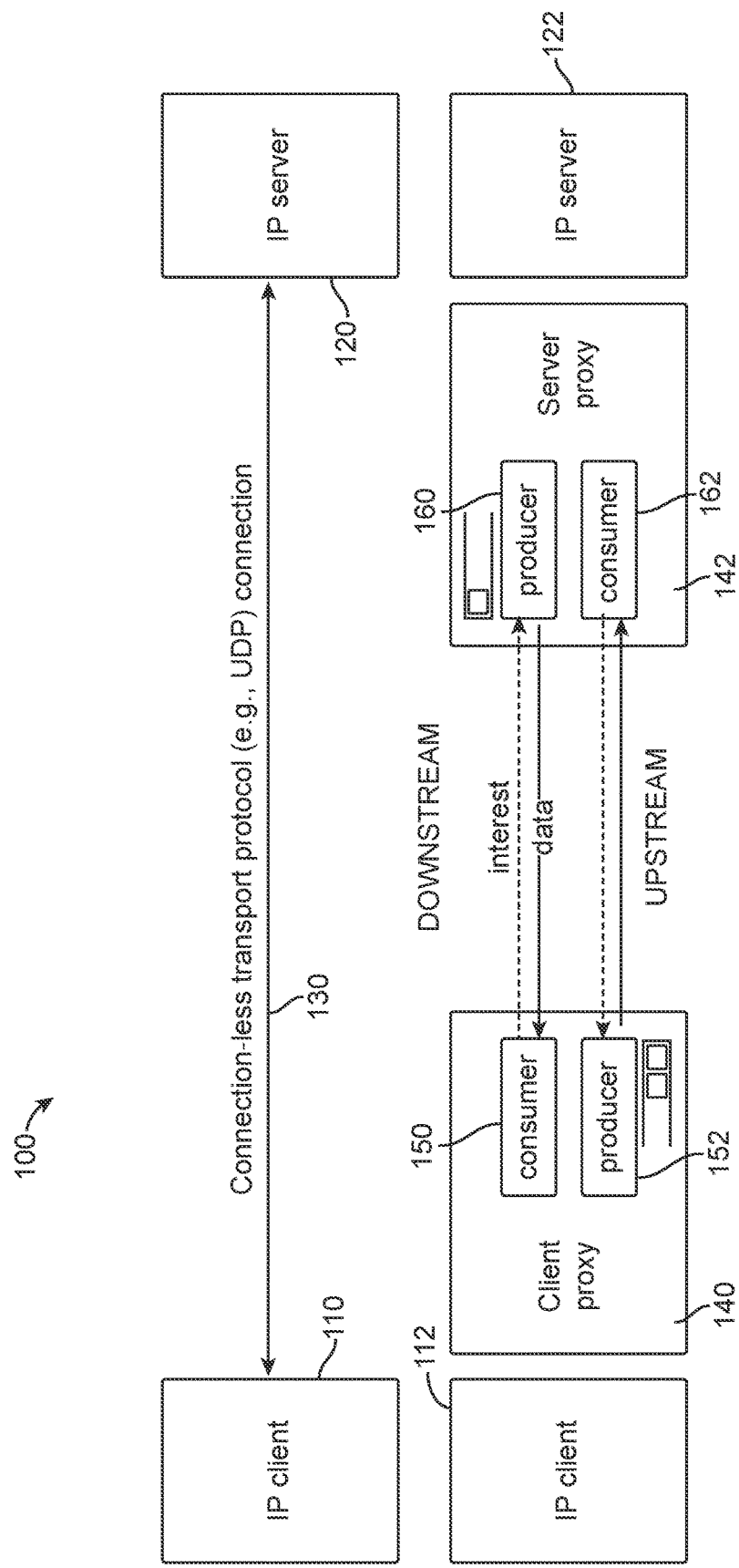
FIG. 1 is a block diagram of a client proxy/server proxy system for which the mechanisms presented herein may be employed, according to an example embodiment.

Presented herein are a combination of techniques that may ensure that the traffic is sent to the proxy right from the first packet without any delay using a transient transport, and upgraded to hICN immediately upon completion of the stack initialization and once there is full hICN connectivity. More specifically, a mechanism is provided to dynamically establish hICN connections to transport latency-sensitive traffic, due to a transient User Datagram Protocol (UDP) fallback. This allows a reliable conversion between the push-based IP model, and the pull-based hICN model with no connectivity interruption. This is useful to implement proxy functionalities exposing regular IP applications to hICN to leverage its benefits in terms of performance or seamless mobility.

In one form, a method is provided that is performed by a first node configured to support hICN. The method includes obtaining a packet to be forwarded to a second node, determining whether an hICN connection between the first node and the second node is operational, and forwarding the packet to the second node either over a transient connectionless transport protocol or over the hICN connection based on whether the hICN connection is operational.

Example Embodiments

Experience has shown operating hICN proxies that there are several situations in which it is not possible or not desirable to have the hICN stack or the full hICN connectivity operational. This prevents the simpler solution to always send traffic of interest to the hICN layer and waiting for the hICN connection to be fully running and configured, resulting in delays that can be expressed in seconds, which is not acceptable in real-time application contexts.

It should also be avoided—to the extent it is possible—to let the traffic flow normally through the IP stack and switch it to be carried over hICN and up to a server proxy as this will likely result in a change of source IP address that will disrupt the flow in progress (e.g., from a wireless connection, such as a wireless local area network or a wireless wide area network, to the source address of the proxy that will implement a technique such as masquerading to allow the reply traffic to flow back through it). Path changes might also impact congestion control/rate adaptation/service discovery/path probing, etc.

Presented herein are a combination of techniques that will ensure that the traffic is sent to the proxy right from the first packet without any delay using a transient transport protocol, and upgraded to hICN immediately upon completion of the stack initialization once there is full hICN connectivity. More specifically, a mechanism is provided to dynamically establish hICN connections to transport latency-sensitive traffic, due to a transient connection-less transport protocol (such as User Datagram Protocol (UDP)) fallback. This allows a reliable conversion between the push-based IP model, and the pull-based hICN model with no connectivity interruption. This is useful when implementing proxy functionalities that expose regular IP applications to hICN to leverage hICN's benefits in terms of performance or seamless mobility.

Transient Connection-Less Transport Protocol (UDP) Fallback

Depending on the context, there are multiple reasons for which an hICN connection might not be available immediately upon reception of a packet to be proxied. The delays, that can last as long as a few seconds, may encompass operations associated with:

1. Ensuring the forwarder is running or requesting the service (e.g., hICN available as a system service; or hICN available as a container orchestration (e.g., Kubernetes™) service);
2. Getting a lease on eventual prefixes on which to produce content;
3. Setting up necessary faces, routes and forwarding strategies through control Application Programming Interfaces (APIs);
4. Starting required consumer and producer sockets; and
5. Waiting for intermediate and remote sides to be up so for full hICN connectivity.

The hICN switch may be triggered upon reception of the first packet or after a specific trigger condition to proxy (eventually any other signal present in a control plane) and establish a transient alternate connection-less transport protocol, such as UDP (changing the protocol number in the IP header), until the hICN connection is fully available or the trigger condition is satisfied. UDP is an example of an IP transport protocol that is suitable for this transient use because it is connection-less and allows for immediate transfer of the received packet. However, other efficient transport protocols (for handling losses) may be used instead of UDP, such as the Quick UDP Internet Connections (QUIC) or the Stream Control Transmission Protocol (SCTP). Whether the UDP connection or the hICN connection is used, the traffic flows similarly through the server and this will ensure no IP change occurs, for instance when switching to hICN, or in the eventual case of a mobility event. An IP transport does not offer the same performance and resiliency as hICN, but this is meant to be used in a transient phase of a few seconds, after which the connection will be protected by hICN.

There are situations in enterprise networks where traffic might be filtered by prefix range and/or ports. As an alternative to having network administrators open the ports, it is often sufficient to have a UDP server to listen on the same IP prefix or IP address. This may be used for online meeting systems, for instance, by having proxy servers deployed within the meeting system cloud. The use of the same IP address is facilitated by the use of containers, and this may allow for sharing ports by embedding a special mark in UDP packet headers, allowing a firewall to detect such "transient hICN traffic" and send it directly to the proxy.

Reusing existing connections will additionally facilitate the connection establishment through network address translations (NATs), firewalls, etc., as it is not necessary to re-implement them over hICN, but instead leverage existing implementations.

Reference is now made to FIG. 1, which illustrates an example of a network arrangement 100 (simplified for purposes of description) that includes a first IP client 110 and a second IP client 112 at a client side and a first IP server 120 and a second IP server 122 at a server side. The first IP client 110 may support a connection-less transport protocol (e.g., UDP) connection 130 with the first IP server 120. A client proxy 140 is provided to support, on behalf of the second IP client 112, hICN connectivity with a server proxy 142 operating on behalf of second IP server 122. The client proxy 140 includes an hICN consumer 150 and an hICN producer 152, and the server proxy 142 likewise includes an hICN producer 160 and an hICN consumer 162.

The hICN consumer 150 of the client proxy 140 sends interests to the hICN producer 160 of the server proxy 142. The hICN producer 160 responds with data that it sends to the hICH consumer 150. The path between the hICN consumer 150 of the client proxy and the hICN producer 160 of the server proxy 142 is referred to as a downstream path between the client proxy 140 and server proxy 142 because data is sent from the server proxy 142 to the client proxy 140 over this path. Conversely, the hICN consumer 162 of the server proxy 142 sends interests to the hICN producer 152 of the client proxy 140. The hICN producer 152 responds with data that it sends to the hICN consumer 162 of the server proxy 142. The path between the hICN producer 152 and the hICN consumer 162 is referred to as an upstream path between the client proxy 140 and server proxy 142.

The mechanisms presented herein are proposed for connections between proxies that are typically point-to-point in hICN as there are in IP, which means there is a single consumer attached to each producer.

A single IP connection, such as the connection 130, involves two sockets (one on each side), is symmetric (it carries both upstream and downstream on the same connection) and is push-based. For instance, the first IP server 120 directly sends downstream traffic to the first IP client 110.

As shown in FIG. 1, for hICN, there are four sockets in total (one consumer and one producer on each side). The flow of traffic is asymmetric (a couple of consumer/producer manages a single direction, upstream or downstream) and the scheme is pull-based. For instance, downstream traffic has first to be requested by the client proxy 140 through an interest, before being retrieved from the server proxy 142.

Packets arriving from the server proxy 142 are published to the network by transport services (producer socket): they are chunked, receive a name, are eventually signed and/or encrypted, and are enqueued to be available for answering corresponding interests. While this might seem an overhead, it is in fact essential in the behavior of hICN and there are appropriate protocols ensuring there is no latency induced by this process (basically ensuring there is always an interest pending when new data is produced).

This works, however, provided the consumer is already running and started the process to queue interests at the producer. It is not possible to simply declare the hICN connection is up when the producer is running, as packets may be queued until the consumer is started, which would result in additional delay/jitter/losses on the path.

In this context, a producer is marked "up" and operational only when it has received a first interest, which is the sign of an active remote consumer. A synchronization protocol may be used to synchronize the sequence numbers and producer rate estimator, which will trigger those messages. The presence of an existing buffer would in addition adversely impact the producer rate estimation.

Detecting hICN Availability

Operations 1 to 4 referred to above as being needed for completion prior to hICN connection availability are generally not an issue, as the proxy will likely be orchestrating this through control Application Programming Interfaces (APIs). At this stage the local configuration is done. The same process might occur on the server, and eventually within the network in case network assistance is to be provisioned.

There is no requirement that operations in the downstream direction and upstream direction be tied to, or made dependent on, each other, as traffic may go over IP in one direction, and hICN in the other one, unless otherwise required by an application. However, the traffic arriving on connection-less transport protocol connection 130 may be inspected for signals that should trigger the start of the hICN stack, which will in turn activate the local consumer, whose interest will allow the producer to be marked as up and the traffic to switch, as described further below.

Figure 2A:
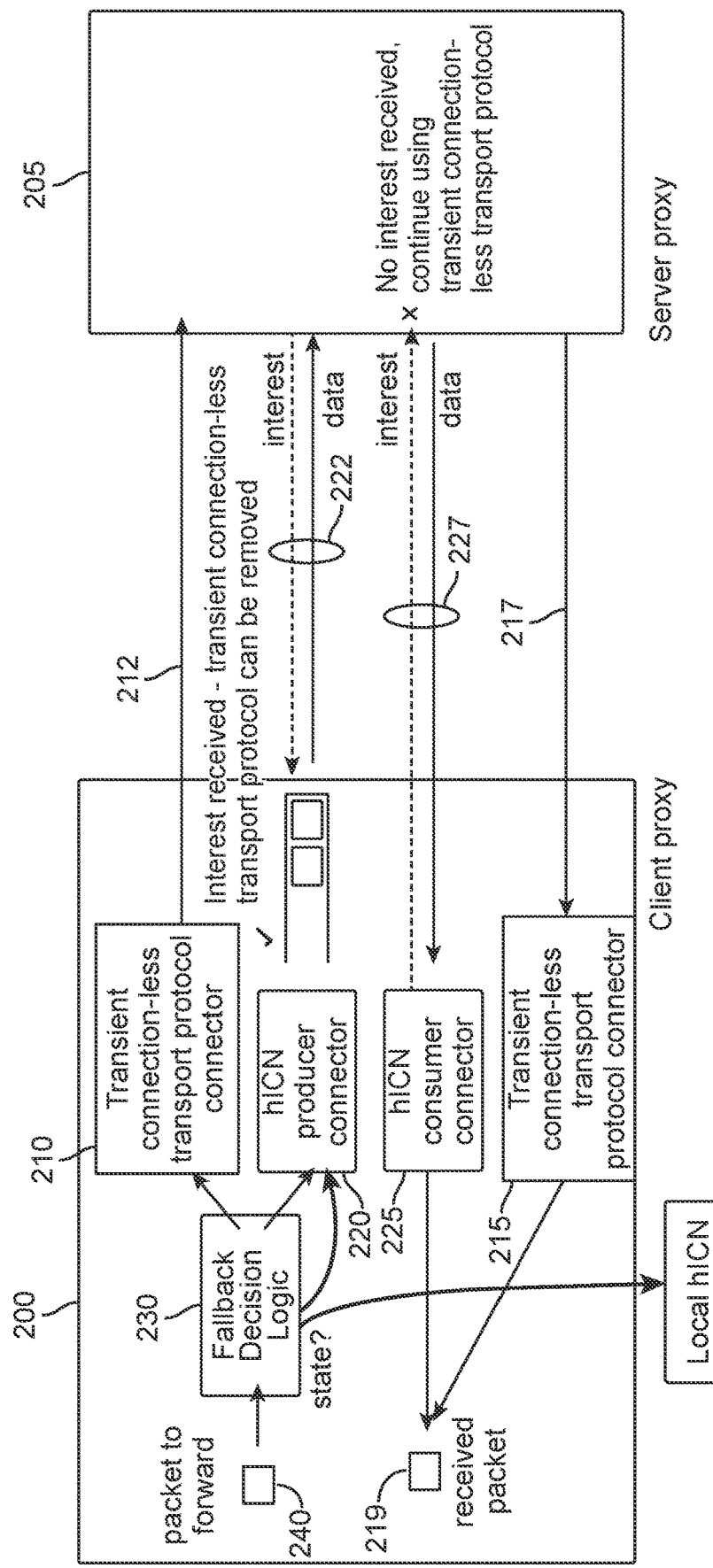
FIG. 2A is a diagram showing a high-level operational flow of the mechanisms for switching from a transient connection-less transport protocol to an hICN connection, according to an example embodiment.

Reference is now made to FIG. 2A. FIG. 2A illustrates a client proxy 200 in communication with a server proxy 205, and in which the proxies are configured to switch from a connection-less transport protocol to an hICN connection. The components of the client proxy 200 are shown in detail and it is to be understood that the server proxy 205 has similar components, but these are not shown in FIG. 2A, for simplicity.

The client proxy 200 includes an upstream transient connection-less transport protocol (e.g., UDP) connector 210, a downstream upstream transient connection-less transport protocol (e.g., UDP) connector 215, an hICN producer connector 220, and an hICN consumer connector 225. The client proxy 200 further includes fallback decision logic 230 that controls a local hICN forwarder 235.

In FIG. 2A, the transient connection-less transport protocol connector 210 sends packets on an upstream connection-less transport protocol connection 212 to the server proxy 205. The hICN producer connector 220 sends Data in an upstream hICN path 222 in response to Interests received from the server proxy 205. Similarly, the transient connection-less transport protocol connector 215 receives packets on a downstream transient connection-less transport protocol connection 217 from the server proxy 205. The hICN consumer connector 225 receives Data from the server proxy 205 over a downstream hICN connection 227 sent in response to Interests received from the hICN consumer connector 225. A received packet 219 is obtained at the output of the transient connection-less transport connector 215 or the output of the hICN consumer connector 225.

Seamless Switch

The client proxy 200 (and server proxy 205) tracks the state of hICN and, when available, switches sent traffic over hICN and deletes the connection-less transport protocol (e.g., UDP) connection. The source address within both the UDP and hICN tunnels is leveraged to carry a unique user identifier that allows for tracking the client traffic across both connections. This can eventually be completed by a shared secret upon name registration, binding the source IP address and the allocated hICN name.

In hICN, there are two circuits/paths—one for the upstream and one for the downstream. They need not be symmetric. The embodiments presented herein involve coupling the two circuits (producer-consumer and consumer-producer) to decide when to send packets based on the state of the local producer/connector and remote consumer/connector.

In the example shown in FIG. 2A, the client proxy 200 obtains a packet 240 to forward to the server proxy 205. In general, it is desirable to send the packet 240 over hICN as soon as possible to benefit from the hICN advantages. The higher layer that provides the packet 240 to be forwarded may not know or care about how the packet is sent (UDP or hICN).

Reference is made to FIG. 2B. FIG. 2B shows packet 240 that can be directed over either a transient connection-less protocol (e.g., UDP) tunnel 250 or an hICN tunnel 260. When sent over the transient connection-less protocol tunnel 250, the transient connection-less transport protocol connector 210 (FIG. 2A) encapsulates the packet 240 with a transient connection-less protocol header 252 that includes a unique user identifier or tag 254 (carried by the source address) to identify the client traffic, when forming an encapsulated packet 256. When the switch is made to the hICN tunnel 260, the hICN producer connector 220 encapsulates the packet 240 with an hICN header 262 that also includes the same unique user identifier or tag 254, when forming an encapsulated packet 264. In this way, traffic across both connections can be tracked. While this is described for client traffic, the same techniques would apply for server traffic.

The fallback decision logic 230 determines whether to send the packet via the connection-less transport protocol connector 210 or via the hICN producer connector 220. More specifically, the fallback decision logic 230 will not select to send the packet via the hICN connection to the server proxy 205 unless the hICN connection is operational. There are two conditions that indicate whether the hICN connection between the client proxy 200 and the server proxy 205 is operation. The first condition is whether the local hICN stack (local hICN forwarder 235) is up and configured. The second condition is whether an interest from remote side consumer, that is, an hICN consumer connector (not shown) at the server proxy 205. The second condition indicates that the hICN stack at the remote proxy, the server proxy 205, is online. When both of these conditions are true, the fallback decision logic 230 knows that the hICN connection is ready, and if packets had been sent via the transient connection-less transport protocol connector 210, the fallback decision logic 230 can switch from the transient connection-less transport protocol connection to the hICN connection and forward the packet 240 via the hICN producer connector 220, as shown in FIG. 2A. This ensures that the switch to the hICN connection does not occur too early, causing unnecessary/unwanted delays in forwarding a packet.

When the fallback decision logic 230 determines that it still waiting for the hICN connection between the client proxy 200 and the server proxy 205 to be up and running, in most cases it will have no choice but to send it over the connection-less transport protocol connection because, again, it is generally desired not to have the packet to sit there waiting to be sent—causes latency issues. This could be a problem for real-time latency sensitive applications (video, etc.) where QoS metric is latency, and is one of the many technical problems the embodiments presented herein solve. The consumer at the server proxy 205 may send Interests at the right rate so that it keeps the queue of the producer (at the client proxy) always empty.

The client proxy 200 and server proxy 205 may perform similar operations with regard to switching from a transient connection-less transport protocol connection to an hICN connection, and these mechanisms on the client proxy 200 and server proxy 205 can operate independently. Thus, as shown in FIG. 2A, on the downstream hICN connection 227, the server proxy 205 will continue using the transient connection-less transport protocol to send packets to the client proxy 200 (via transient connection-less transport protocol connection 217) until the server proxy 205 receives an Interest from the hICN consumer connector 225 of the client proxy 200. Moreover, the fallback decision logic 230 at the client proxy 200 can operate independently of similar fallback decision logic at the server proxy 205.

Delayed hICN Switch

There are cases where it is not always desirable to trigger the switch to the hICN connection for the first packet when the hICN connection is operational. This is, for example, the case when proxying online conference media traffic: a video call starts with multiple Session Traversal Utilities for NAT (STUN) probes sent towards the different candidate video bridges. While the hICN forwarder can be started, as there will likely be a call, it would be unnecessary to establish faces and routes towards the different server proxies that would be involved, nor reserve resources at each of them. No traffic will further flow towards them. The same occurs for "ping" or traceroute probes carried over Internet Control Message Protocol (ICMP).

The mechanism thus includes a configurable trigger (for instance, based on a period of time since flow start, number of packets or protocol, etc.) during which the transient connection-less transport protocol fallback will be used without triggering any attempt to switch to the hICN connection.

The hICN switch may be triggered upon reception of the first packet, or after a specific trigger condition (e.g., after N packets are seen to avoid creating hICN connections for nothing on flows that may be made only a single packet, such as during probing) to proxy (eventually any other signal present in a control plane) and establish a transient alternate connection-less transport protocol, such as UDP (changing the protocol number in the IP header), until the trigger condition is satisfied.

Thus, as described, it may be desired not to start the hICN stack immediately (at the first packet) and instead delay sending over the hICN connection. It may be desirable to wait until $2^{nd}$ packet or 10 packets or 10 bytes, etc. In fact, if using the hICN connection is delayed, the benefits of hICN gains are achieved, except that only one connection is created, instead of possibly numerous connections, which saves networking and computing resources.

Figure 3:
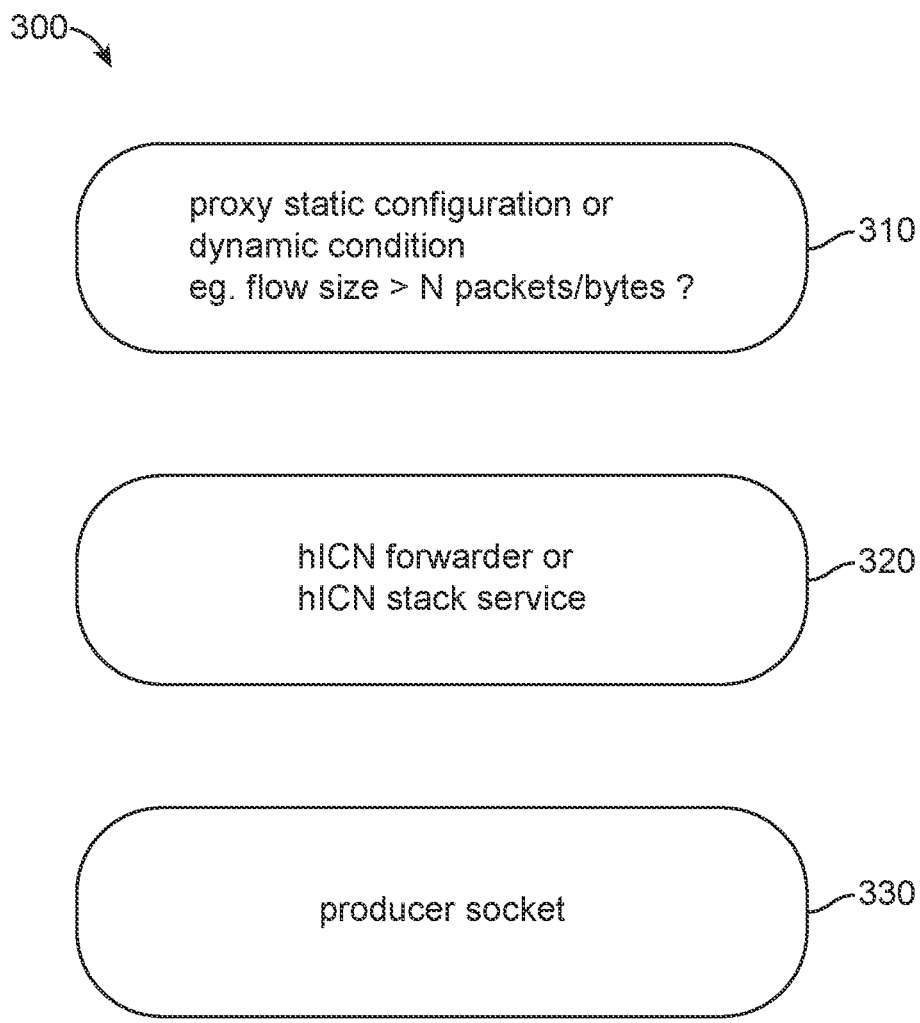
FIG. 3 is a diagram depicting conditions on which the mechanisms for mechanisms for switching from a transient connection-less transport protocol to an hICN connection may be performed, according to an example embodiment.

Reference is now made to FIG. 3. FIG. 3 shows a data decision structure 300 that represents conditions and configurations that may be used by the fallback decision logic 230. The data decision structure 300 includes a configuration 310 that is either a proxy static configuration—switch to hICN once the hICN connection is operational, or a dynamic condition—such as switch to the hICN connection (assuming it is operational or when it becomes operational) once the queue flow size is greater than some threshold condition (N packets or bytes), or some period of time has elapsed, etc.

At 320, the state of the hICN forwarder or of the hICN stack service of the local proxy is evaluated.

At 330, the state of the producer socket is evaluated, and in particular, when it has received an Interest from the remote proxy that indicates that the hICN consumer at the remote proxy is up and running.

Figure 4:
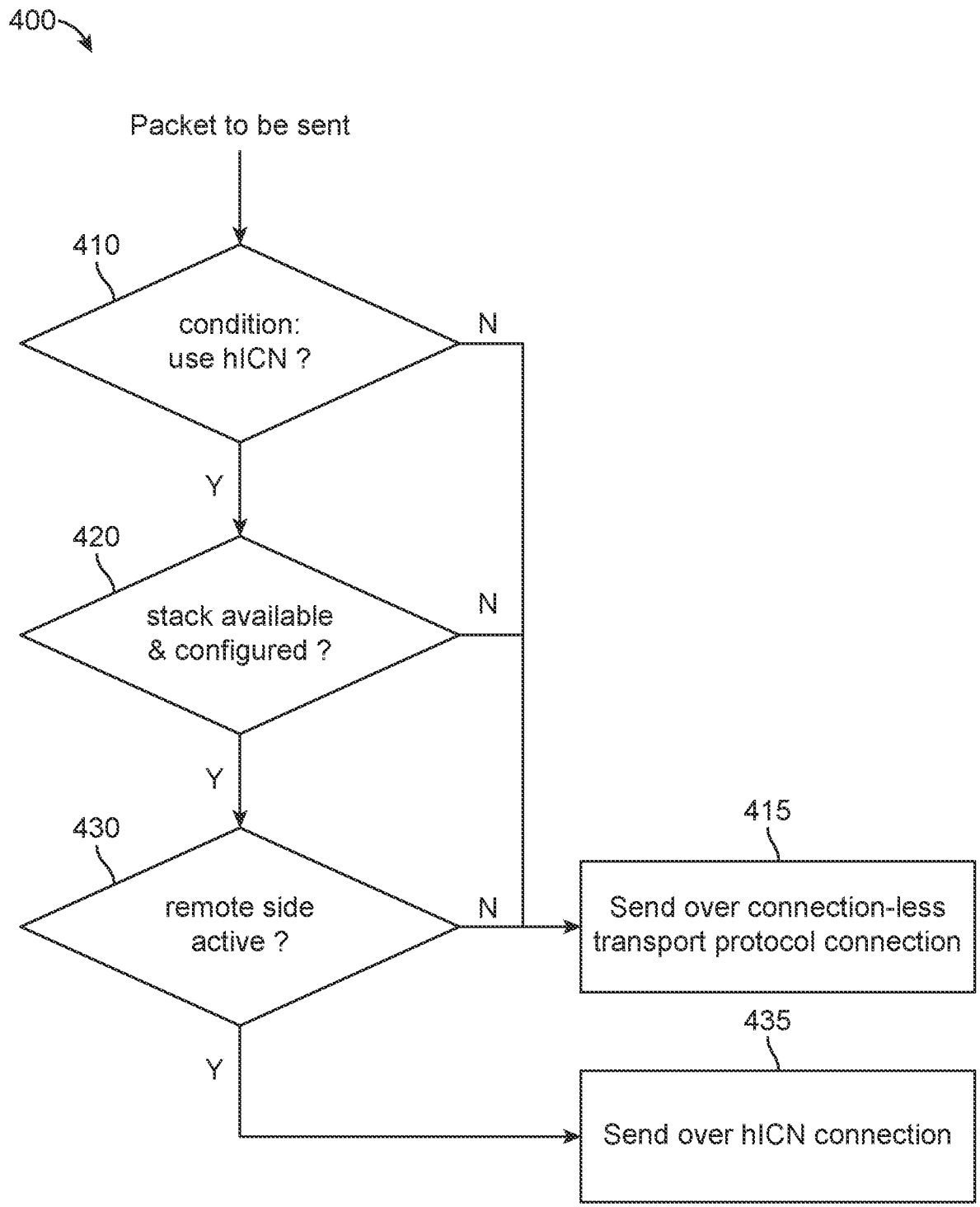
FIG. 4 is a flow chart depicting operations of decision logic made at a client proxy or server proxy for switching from a transient connection-less transport protocol to an hICN connection, according to an example embodiment.

FIG. 4 illustrates a flow chart of a process 400 that may be performed by the fallback decision logic 230 upon obtaining a packet to be sent by the proxy to a remote proxy. At 410, it is determined whether the packet is to be sent over an hICN connection. If it is determined that the packet is not to be sent over the hICN connection, then as shown at 415 it is sent over a connection-less transport protocol (e.g., UDP) connection.

If it is determined that the packet is to be sent over the hICN connection, then at 420, it is determined whether the local hICN stack is available (up and running) and configured (thus, operational). If it is determined at 420, that the local hICN stack is not available and configured, then at 415, the packet is sent over connection-less transport protocol connection. When it is determined, at 420, that the local hICN stack is available and configured, then the process 400 proceeds to 430. For instance, "stack available and config-ured" may be given by either the "forwarder entity" or the service wrapping it, such as an "hICN stack service".

At 430, a determination is made as to whether the remote side (hICN stack) of the hICN connection is active. When it is determined, at 430, that the remote side of the hICN connection is not active, then the packet is sent connection-less transport protocol connection at 415. When it is determined, at 430, that the remote side of the hICN connection is active, then, at 435, the packet is sent over the hICN connection.

Figure 5:
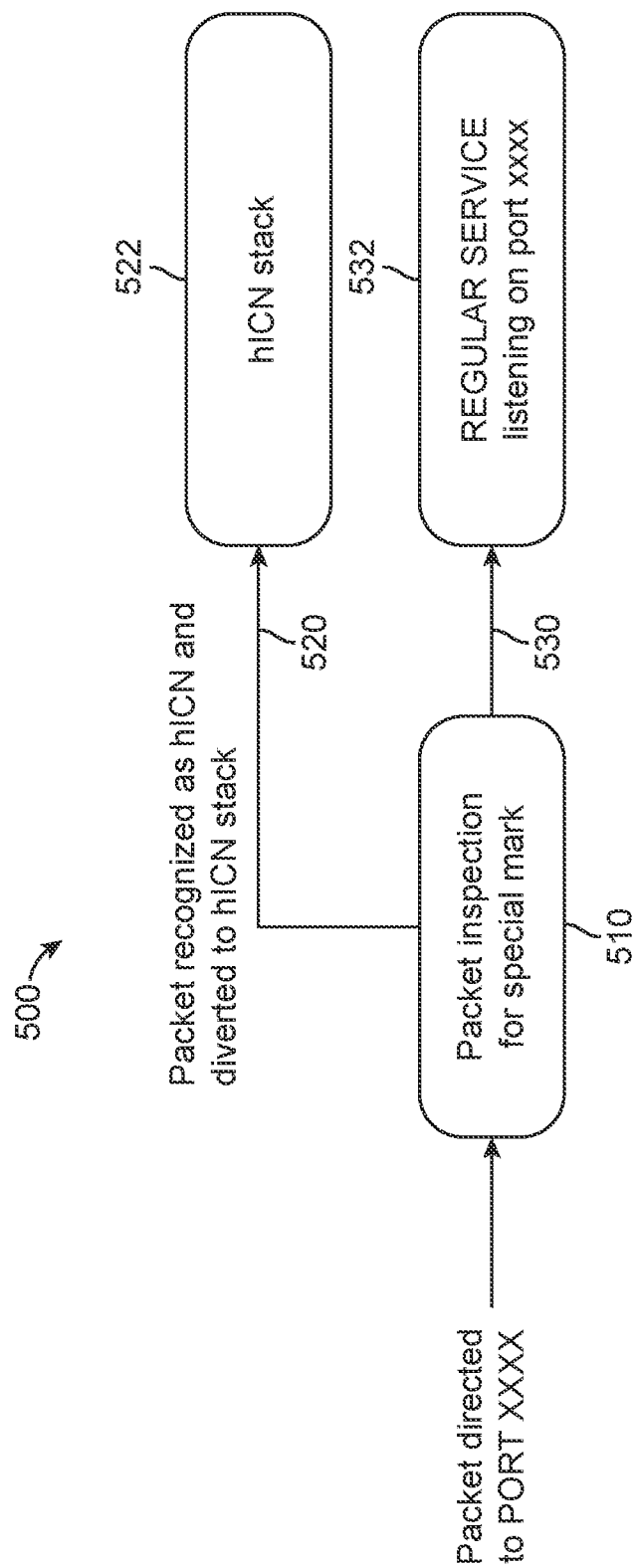
FIG. 5 is an operational flow diagram illustrating how detecting a special mark in a packet may be used to divert the packet to an hICN stack, according to an example embodiment.

As mentioned above, the same IP address is facilitated by the use of containers, and this may allow for a sharing port by an hICN stack and regular (IP-based) service. This may be achieved by embedding a special mark in UDP packet headers. Turning now to FIG. 5, a diagram is shown of a process 500 to detect such a special mark may be used. A packet is directed to a given port denoted as "Port XXXX". At 510, the packet is inspected for presence of the special mark that indicates whether the packet is an hICN packet. If the packet is recognized as an hICN packet, then at 520, it is diverted to the hICN stack 522. Otherwise, if the special mark is not presence, then at 530 the packet is diverted to the regular (IP-based) service 532 that is configured to listen on Port XXXX. Again, the process 500 allows a firewall or other similar network device to detect such "transient hICN traffic" and send it directly to the proxy.

hICN Face Abstraction Extension

A typical hICN face abstraction may be extended with this fallback mechanism, in order to natively support such resilient face establishment for any application.

As referred to herein in this Specification, the term 'interface' is used to describe a functional unit (e.g., a physical network interface) configured for a network element through which packets can enter and leave the network element and the term 'ICN face' is used to describe or identify an adjacency to another network element via a logical connection with the other network element. An ICN face can be distinguished from an hICN face in that an hICN face does not implement an adjacency with a specified next hop router known in advance where packet transmissions are unicast. Rather, an hICN face can be used to maintain an adjacency between two hICN-enabled IP routing nodes, which may or may not be next hop neighbors with each other (e.g., one or more non-hICN-enabled IP routing nodes may lie on the path between the two hICN-enabled IP routing nodes). In at least one embodiment, an hICN face can be implemented similar to an Address Resolution Protocol (ARP) table to register a local IP interface (e.g., identified by the IP address of the hICN face) and source IP address(es) identified in IP Interest(s) received on the interface. An IP routing node can have several local IP interfaces.

FIG. 6A shows how these techniques may be implemented without hICN face abstraction, as shown at 600. Without hICN face abstraction, there is a forwarder interface 610, a decision process 620 (similar to that performed by the fallback decision logic 230 shown in FIG. 2A), and flow state 630 that mains flow state separately for the connection-less transport protocol connector 640 and for the hICN connector 650 (for both the Consumer (C) and Producer (P)).

FIG. 6B shows how these techniques may be implemented with hICN face abstraction, as shown at 660. With face abstraction, the flow state 630' views the connectors as one "reliable hICN connector" 670 that uses either the connection-less transport protocol or hICN, to transport a packet.

Use Cases

Some cases have already been mentioned above. The following additional description of use cases is provided.

Mobile Environments

On a mobile device, the proxy may be running as a system service and may monitor packets worth transporting over hICN. Nevertheless, it may not be desirable to have the hICN stack always running. For example, it may be desirable to have the hICN stack always running to avoid maintaining connections up (e.g., keepalives for UDP connections because of Network Address Translations (NATs)), that would wake the radios up unnecessarily. In addition, it may be desirable to have the hICN stack always running to avoid consuming resources for all potential clients. In practice, only relevant traffic is envisioned to be transported over hICN, and such applications might not be always active. By taking name leases, forward information base (FIB) space, and other resources only when necessary, this allows the process to scale with the number of active clients, and not the total number of installed phones. Further still, keeping the hICN stack always up may help to avoid consuming memory (e.g., Random Access Memory (RAM)) and processing resources (although such a process should be mostly idle, except for periodic refreshes), though it is worth shutting down processes and freeing resources up periodically.

With services being distributed in nature, it is not conceivable to reserve those resources on all potential proxies, nor to bind a client to a given proxy that would not be a fit for a given connection. Instead, it is better to create connections on demand, and perform server selection on the basis of each flow requirements.

Cloud-Native Infrastructure

In a cloud deployment (e.g., such as one orchestrated using Kubernetes orchestration technology), there are many reasons why it may be desirable to spawn a new hICN service on-the-fly (on-demand), in addition to the reasons mentioned in the mobile use case, such as service migration, or scalability of application or hICN resources (high-availability, load balancing, etc.).

Real-Time Communication Services Conference Sessions

Some real-time communication services, such as online conference/meeting services, perform proxy implementations without these mechanisms, and issues may be experienced in startup and performance, such as triggering unreachability and unreliability issues affecting user Quality of Experience (QoE), and a switch to a fallback connection from Real-Time Transport Protocol (RTP)/UDP over Transmission Control Protocol (TCP). The techniques presented herein solved these issues.

Cloud-based applications, such as online meeting applications, have different redundant instances at different locations in the network, which produce probe values and points before starting. Sending packets to several proxies, sometimes many probes, and setting up all of these hICN resources can be wasteful.

The mechanism presented herein involves several unique aspects, including detecting full hICN connectivity, including inferring a remote hICN state, and synchronizing both consumers and producers involved in a communication session. A method and system are provided to reliably switch traffic from IP to hICN using a transient connection-less IP transport connection, such as UDP. Further, a method and system are provided to share the connection that will carry hICN, but use for the transient connection-less IP transport connection. Further still, a method and system are provided to distinguish hICN from non-hICN traffic arriving on the same endpoint. Finally, a method and system are provided for reliable hICN face implementation, abstracting higher level applications (such as the proxy itself) from such complexity.

In summary, hICN is showing promising interest for improving the QoE and performance of application traffic in multiple use cases, especially for transporting latency-sensitive traffic such as RTC/gaming/etc. There are several candidate deployments in mobile or cloud contexts where applications are generally not (yet) hICN-aware, and a proxy is leveraged to make the conversion. Switching traffic to hICN might not be instantaneous due to various delays in configuring the stack or even delay switching to hICN on demand (up to a few seconds). In one form, the mechanism may involving transporting the traffic right from the first received application packet, and seamlessly switch it to a full-featured hICN connection when the stack is fully available and configured.

Figure 7:
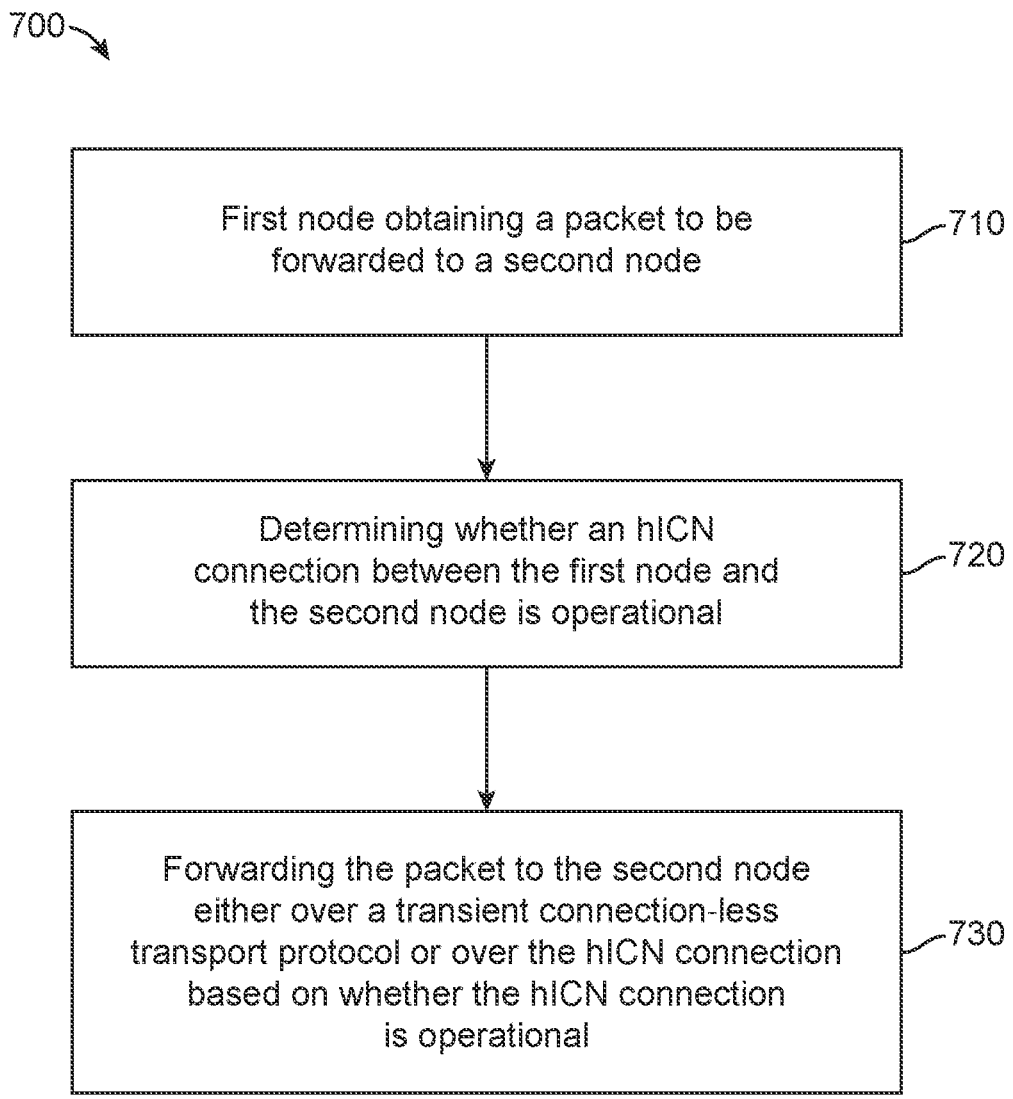
FIG. 7 is a high-level flow chart of a method, according to an example embodiment.

Reference is now made to FIG. 7, which illustrates a flow chart for a method 700 according to an example embodiment. The method 700 may be performed by a first node (e.g., a proxy) configured to support hybrid Information-Centric Networking (hICN). At 710, the method 700 involves the first node obtaining a packet to be forwarded to a second node. At 720, the method 700 involves the first node determining whether an hICN connection between the first node and the second node is operational. At 730, the first node forwards the packet to the second node either over a transient connection-less transport protocol or over the hICN connection based on whether the hICN connection is operational.

As described above, the operation 720 of determining whether the hICN connection is operational may include: determining whether an hICN stack of the first node is up and running; and determining whether an hICN stack of the second node is up and running.

Further, determining whether the hICN stack of the second node is up and running may include detecting reception of an interest sent by an hICN consumer of the second node.

The obtaining operation 710 may include obtaining a sequence of a plurality of packets to be forwarded to the second node. The forwarding operation 720 may include forwarding individual packets of the plurality of packets over the transient connection-less transport protocol to the second node until it is determined that the hICN connection is operational, and switching to forwarding over the hICN connection when it is determined that the hICN connection is operational.

The method 700 may further include, after it is determined that the hICN connection is operational, delaying the switching to forwarding over the hICN connection for a period of time or for a predetermined number of packets of the plurality of packets.

The connection-less transport protocol may be any of a variety of suitable protocols, such as UDP, QUIC or SCTP.

As described above in connection with FIG. 2A, the first node may serve as a client proxy for an IP client and includes an hICN consumer and an hICN producer, and the second node serves as a server proxy for an IP server and includes an hICN consumer and an hICN producer, or the first node serves as an IP proxy for an IP client and includes an hICN consumer and an hICN producer and the second node serves as a server proxy for an IP server and includes an hICN consumer and an hICN producer.

Figure 8:
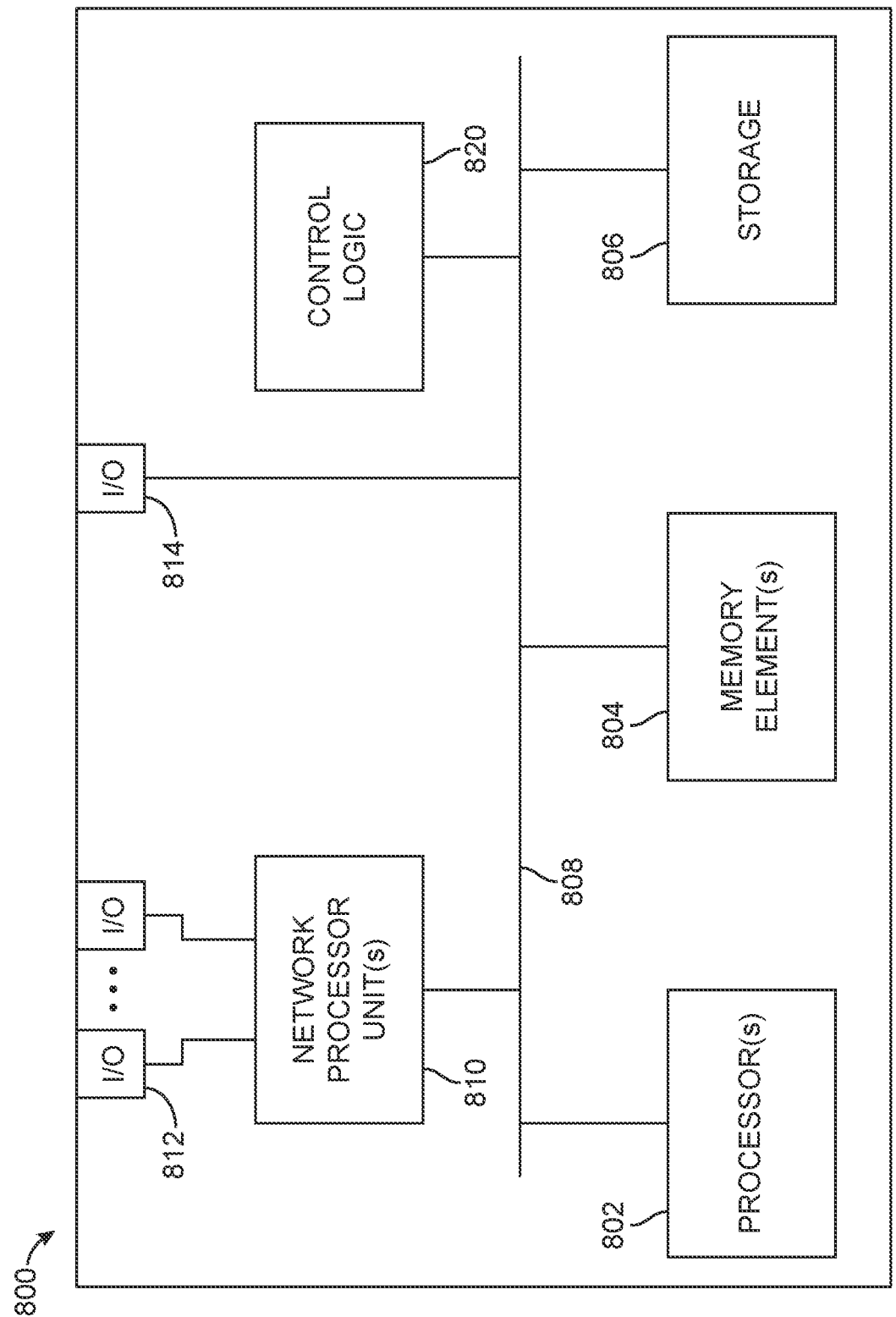
FIG. 8 is a block diagram of a computing device that may be configured to perform the operations presented herein, according to an example embodiment.

Referring to FIG. 7, FIG. 8 illustrates a hardware block diagram of a computing device 800 that may perform functions associated with operations discussed herein in connection with the techniques depicted in FIGS. 1-7.

In at least one embodiment, the computing device 800 may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with memory element(s) 804 (or vice versa), or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 (wired and/or wireless) to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, any other I/O port(s), and/or antenna(s)/antenna array(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that may be connected to computer device 800. For example, I/O interface(s) 814 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 804 and/or storage 806 can store data, software, code, instructions (e.g., processor instructions), logic, parameters, combinations thereof, and/or the like used for operations described herein. This includes memory element(s) 804 and/or storage 806 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In one form, a method is provided that is performed by a first node configured to support hICN. The method comprises obtaining a packet to be forwarded to a second node; determining whether an hICN connection between the first node and the second node is operational; and forwarding the packet to the second node either over a transient connection-less transport protocol or over the hICN connection based on whether the hICN connection is operational.

In another form, an apparatus is provided that includes: one or more interfaces configured to send or receive network traffic on behalf of a first node configured to support hICN; and one or more processors coupled to the one or more interfaces, the one or more processors configured to perform operations including: obtaining a packet to be forwarded to a second node; determining whether an hICN connection between the first node and the second node is operational; and forwarding the packet to the second node either over a transient connection-less transport protocol or over the hICN connection based on whether the hICN connection is operational.

In still another form, one or more non-transitory computer readable storage media are provided, encoded with instructions that, when executed by a processor of a first node configured to support hICN, cause the processor to perform operations including: obtaining a packet to be forwarded to a second node; determining whether an hICN connection between the first node and the second node is operational; and forwarding the packet to the second node either over a transient connection-less transport protocol or over the hICN connection based on whether the hICN connection is operational.

In still another form, a system may be provided that includes a first node and a second node, each configured to support hICN. The first node may be a client proxy and the second node may be a server proxy. The first node obtains a packet to be forwarded to the second node, determines whether an hICN connection between the first node and the second node is operational, and forwards the packet to the second node either over a transient connection-less transport protocol or over the hICN connection based on whether the hICN connection is operational. Similarly, the second node obtains a packet to be forwarded to the first node, determines whether the hICN connection between the first node and the second node is operational, and forwards the packet to the first node either over the transient connection-less transport protocol or over the hICN connection based on whether the hICN connection is operational.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method performed by a first node configured to support hybrid Information-Centric Networking (hICN), the method comprising:
    obtaining a sequence that includes a plurality of packets to be forwarded to a second node;
    inspecting a first packet of the plurality of packets to be forwarded over a transient connection-less transport protocol to determine whether to establish an hICN connection, wherein the transient connection-less transport protocol is for a fallback connection while the hICN connection is being setup;
    determining whether the hICN connection between the first node and the second node is operational, wherein determining whether the hICN connection is operational includes determining whether an hICN stack of the second node is up and running based on whether an interest packet is received from the second node; and
    forwarding the first packet to the second node by forwarding the first packet over the hICN connection based on determining that the hICN connection is operational and over the transient connection-less transport protocol based on determining that the hICN connection is not operational, wherein forwarding includes:
        forwarding individual packets of the plurality of packets over the transient connection-less transport protocol to the second node until a determination is made that the hICN connection is operational, and
        switching to forwarding over the hICN connection when the determination is made that the hICN connection is operational.

2. The method of claim 1, wherein determining whether the hICN connection is operational further includes:
    determining whether a local hICN stack of an hICN producer of the first node is up and running.

3. The method of claim 2, wherein determining whether the local hICN stack of the hICN producer of the first node is up and running involves determining whether a local hICN forwarder at a local proxy is up online and configured to transmit traffic.

4. The method of claim 1, further comprising:
    after it is determined that the hICN connection is operational, delaying switching to forwarding over the hICN connection for a period of time or for a predetermined number of packets of the plurality of packets.

5. The method of claim 1, wherein the transient connection-less transport protocol is User Datagram Protocol (UDP), Quick UDP Internet Connections (QUIC) protocol, or Stream Control Transmission Protocol (SCTP).

6. The method of claim 1, wherein the first node serves as a client proxy for an Internet Protocol (IP) client and includes a first hICN consumer and a first hICN producer, and the second node serves as a server proxy for an IP server and includes a second hICN consumer and a second hICN producer, or the first node serves as an IP proxy for an IP client and includes a third hICN consumer and a third hICN producer and the second node serves as the server proxy for the IP server and includes a fourth hICN consumer and a fourth hICN producer.

7. The method of claim 1, wherein the first node includes a first hICN consumer and a first hICN producer, the second node includes a second hICN consumer and a second hICN producer, and the first node switches the first hICN producer to and from the hICN connection independently from the first hICN consumer.

8. The method of claim 7, further comprising:
forwarding, by the first node to the second node, an interest to trigger the second node to switch to the hICN connection for the first hICN consumer of the first node.

9. The method of claim 1, further comprising:
deleting the fallback connection that uses the transient connection-less transport protocol based on switching the individual packets of the plurality of packets to the hICN connection.

10. The method of claim 1, further comprising:
tracking the sequence of the plurality of packets in the fallback connection and in the hICN connection, based at least in part on a unique user identifier.

11. An apparatus comprising:
one or more interfaces configured to send or receive network traffic on behalf of a first node configured to support hybrid Information-Centric Networking (hICN); and
one or more processors coupled to the one or more interfaces, the one or more processors configured to perform operations including:
obtaining a sequence that includes a plurality of packets to be forwarded to a second node;
inspecting a first packet of the plurality of packets to be forwarded over a transient connection-less transport protocol to determine whether to establish an hICN connection, wherein the transient connection-less transport protocol is for a fallback connection while the hICN connection is being setup;
determining whether the hICN connection between the first node and the second node is operational, wherein determining whether the hICN connection is operational includes determining whether an hICN stack of the second node is up and running based on whether an interest packet is received from the second node; and
forwarding the first packet to the second node by forwarding the first packet over the hICN connection based on determining that the hICN connection is operational and over the transient connection-less transport protocol based on determining that the hICN connection is not operational, wherein forwarding includes:
forwarding individual packets of the plurality of packets over the transient connection-less transport protocol to the second node until a determination is made that the hICN connection is operational, and
switching to forwarding over the hICN connection when the determination is made that the hICN connection is operational.

12. The apparatus of claim 11, wherein the one or more processors are configured to determine whether the hICN connection is operational further by:
determining whether a local hICN stack of an hICN producer of the first node is up and running.

13. The apparatus of claim 11, wherein the one or more processors are further configured to perform operations including:
after it is determined that the hICN connection is operational, delaying switching to forwarding over the hICN connection for a period of time or for a predetermined number of packets of the plurality of packets.

14. The apparatus of claim 11, wherein the transient connection-less transport protocol is User Datagram Protocol (UDP), Quick UDP Internet Connections (QUIC) protocol, or Stream Control Transmission Protocol (SCTP).

15. The apparatus of claim 11, wherein the first node serves as a client proxy for an Internet Protocol (IP) client and includes a first hICN consumer and a first hICN producer, and the second node serves as a server proxy for an IP server and includes a second hICN consumer and a second hICN producer, or the first node serves as an IP proxy for an IP client and includes a third hICN consumer and a third hICN producer and the second node serves as the server proxy for the IP server and includes a fourth hICN consumer and a fourth hICN producer.

16. The apparatus of claim 11, wherein the first node includes a first hICN consumer and a first hICN producer, the second node includes a second hICN consumer and a second hICN producer, and the first node switches the first hICN producer to and from the hICN connection independently from the first hICN consumer.

17. One or more non-transitory computer readable storage media encoded with instructions that, when executed by a processor of a first node configured to support hybrid Information-Centric Networking (hICN), cause the processor to perform operations including:
obtaining a sequence that includes a plurality of packets to be forwarded to a second node;
inspecting a first packet of the plurality of packets to be forwarded over a transient connection-less transport protocol to determine whether to establish an hICN connection, wherein the transient connection-less transport protocol is for a fallback connection while the hICN connection is being setup;
determining whether the hICN connection between the first node and the second node is operational, wherein determining whether the hICN connection is operational includes determining whether an hICN stack of the second node is up and running based on whether an interest packet is received from the second node; and
forwarding the first packet to the second node by forwarding the first packet over the hICN connection based on determining that the hICN connection is operational and over the transient connection-less transport protocol based on determining that the hICN connection is not operational, wherein forwarding includes:
forwarding individual packets of the plurality of packets over the transient connection-less transport protocol to the second node until a determination is made that the hICN connection is available and operational, and
switching to forwarding over the hICN connection when the determination is made that the hICN connection is available and operational.

18. The non-transitory computer readable storage media of claim 17, wherein the instructions operable for determining whether the hICN connection is operational include instructions further operable for:
determining whether a local hICN stack of an hICN producer of the first node is up and running.

19. The non-transitory computer readable storage media of claim 17, further comprising instructions operable for:

after it is determined that the hICN connection is operational, delaying switching to forwarding over the hICN connection for a period of time or for a predetermined number of packets of the plurality of packets.

20. The non-transitory computer readable storage media of claim 17, further comprising instructions operable for:
deleting the fallback connection that uses the transient connection-less transport protocol after switching the individual packets of the plurality of packets to the hICN connection.

* * * * *